Dec. 5, 1967 W. F. WILLIAMS 3,356,918
TAPE CONTROLLED POSITIONING AND TUNING SYSTEM
Filed July 23, 1964 5 Sheets-Sheet 1

INVENTOR.
WINSTON F. WILLIAMS
BY
Moody & Anderson
AGENTS

Dec. 5, 1967   W. F. WILLIAMS   3,356,918
TAPE CONTROLLED POSITIONING AND TUNING SYSTEM
Filed July 23, 1964   5 Sheets-Sheet 5

INVENTOR.
WINSTON F. WILLIAMS
BY
Moody & Anderson
AGENTS 3,356,918
TAPE CONTROLLED POSITIONING AND
TUNING SYSTEM
Winston F. Williams, Cedar Rapids, Iowa, assignor to
Collins Radio Company, Cedar Rapids, Iowa, a corporation of Iowa
Filed July 23, 1964, Ser. No. 384,610
13 Claims. (Cl. 318—18)

ABSTRACT OF THE DISCLOSURE

A shaft positioning system employing a magnetically pipped tape as the controlling input to a control system. A shaft position is selected by means of positioning selector switches to cause a controlling impulse to be generated when a preselected number of recorded impulses corresponding to the selected tape position passes a pick-up device. The generated impulse stops the positioning sequence by de-energizing the prime mover which controls both the tape advance and the positioning of the remote device. A plurality of tape tracks with appropriately premagnetized impulses permits control in a vernier-like fashion.

---

This invention relates generally to remote shaft positioning system and more particularly to a shaft positioning system employing a magnetically pipped tape as the controlling input to a system wherein the positioned device is caused to be rotated in conjunction with the travel of the magnetic tape past the tape pick-up heads employed to read out the magnetically recorded "pulses."

Known forms of remote automatic shaft positioning employ various coding arrangements and wire saving schemes by which a servo motor is caused to rotate an open seeking switch to a null or "off" position and wherein this null position may selectively defined by preselected control switch positions. The accuracy of such devices is limited by physical switch limitations when considering the selection of step-by-step remote control and for continuous preselection of remote positions is generally limited by mechanical cam arrangements, etc.

The present invention provides remote shaft positioning by utilizing a magnetic tape upon which magnetic impulses are recorded in correspondence with shaft position increments. The magnetic tape is caused to pass over the pick-up transducer at a rate considerably faster than that at which the remote shaft is positioned. Thus, for example, a remote shaft might be positioned to a number of preselected points about one complete revolution under the control of a magnetic tape upon which the controlling magnetic pulses are magnified by spreading them over a considerable tape footage. The accuracy, therefore, with which the position of magnetic impulses on the tape are determined by the pick-up device is multiplied considerably as concerns the positioning of the controlled shaft per se.

An object, therefore, of the present invention is the provision of a remote shaft positioning device of increased accuracy and versatility as compared to known positioning devices. The invention is featured in the provision of a magnetically pipped tape which is caused to pass a magnetic pick-up. A remote shaft position is selected by means of positioning selector switches which effectively cause a controlling impulse to be generated when a preselected number of recorded impulses have passed the pick-up device. A counter arrangement is employed to count the magnetic impulses and the preselection circuitry generates a control or stop impulse when a number of magnetic pips corresponding to a precise tape position have been counted. The impulse stops the positioning sequence by de-energizing the prime mover which controls both the tape advance and the positioning of the remote device. Circuitry is provided to ready the positioning system for a repeat cycle.

In a more sophisticated embodiment the prepipped positioning impulses on the magnetic tape might be placed on a plurality of tracks in a vernier-like fashion. A first track might, therefore, position the controlled device to a predetermined coarse position while subsequent tape tracks are prepipped to tenths, hundredths and thousandths as compared to the coarse increment intervals.

A further feature of the present invention is the provision of an automatic positioning apparatus uniquely applicable to tuned electronic circuits whereby the controlling tape may be prepipped magnetically in correspondence with the particular resonance characteristics of the tuned circuit in lieu of a linear positioning arrangement. In this instance a positioning tape and a tunable device may be "customized," so to speak, whereby the characteristics of a tuned circuit as a function of the rotation of an input shaft thereto may be utilized to prepip a magnetic tape and subsequently may be used to tune the remote device to a desired point in its tuning range. This feature is made uniquely possible by the manner in which the controlling circuitry of the invention is based on the counting of magnetic pips rather than upon the precise positioning of some fixed mechanical arrangement, etc., as is found in known remote positioning schemes.

These and other features and objects of the present invention will become apparent upon reading the following description in conjunction with the accompanying drawings in which.

As indicated above, the present invention provides a two-fold utility in allowing remote positioning on a customized basis whereby the control is established as an absolute function of the device characteristic of the device to be controlled. A second advantage is attainment of a degree of accuracy by selective control magnification; that is, the controlling input parameter is magnified on a time-position as compared to the actual mechanical positioning of the control device. Thus, rather than controlling a shaft to a plurality of positions by means of a controlling switch having predetermined positions, the present invention enables a plurality of remote shaft positions to be indicated magnetically on a tape, the length of which may be limited only by the mechanical limitations as to the speed of tape travel which might be utilized.

Figure 1:
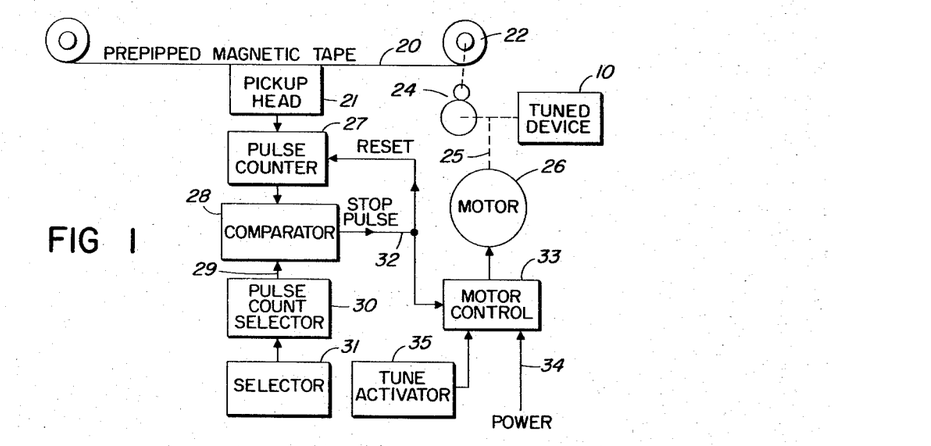
FIGURE 1 is a functional block diagram of a "single channel" embodiment of the present invention.
Figure 2A:
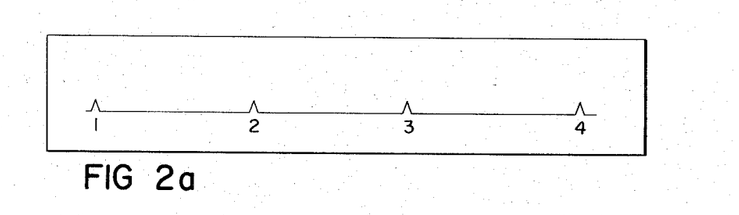
FIGURES 2a and 2b are diagrammatic representations of magnetic tapes onto which positioning pips have been recorded to effect positioning control in accordance with the invention.

A basic embodiment of the present invention is illustrated functionally in FIGURE 1. The transducer portion of the positioning system is a magnetic tape 20 upon which prerecorded magnetic impulses may be placed as indicated in FIGURE 2a. Consider, for example, that four such impulses, 1–4, are placed at equal intervals along a length of tape 20. Let it be assumed that the tape 20 is caused to travel over a pick-up head 21 from a "home" position at pip 1 through the second, third and fourth pips, as indicated in FIGURE 1. The pick-up head 21 indicates the passage of the pips 1–4 as the tape is passed over the head under the influence of a rotational input from a motor 26. A pulse counter 27 receives the output from pick-up head 21. Pulse counter 27 provides an output corresponding to the number of pulses detected in the sequence 1–4. The output from the pulse counter 27 is applied to a comparator device 28 to which is applied a second input 29 from a pulse count selector 30. A frequency selector 31 determines the selection effected in the pulse count selector 30 and comparator 28 produces an output or stop pulse 32 when the number of pulses counted equals the preselected number. Since the tape is caused to pass over the pick-up head by the same motor 26 which positions the tuned device 10, the system of the invention effects a definite position of tuned device 10 as a function of the number of pulses detected by pick-up head 21. Generally, the stop pulse 32 from the comparator 28 is utilized to reset the pulse counter to zero and to stop the motor 26 through action of a motor control circuitry 33. The tape is thus driven from a "home" position to where a preselected magnetic pip is detected at which time the motor and thus the tape translation are stopped. A tune or position actuator 35 operates in conjunction with motor control 33 to drive the positioning system to its "home" position and subsequently reverse the drive until a preselected pulse is effected. Details of the motor control circuitry will be further discussed.

Figure 3:
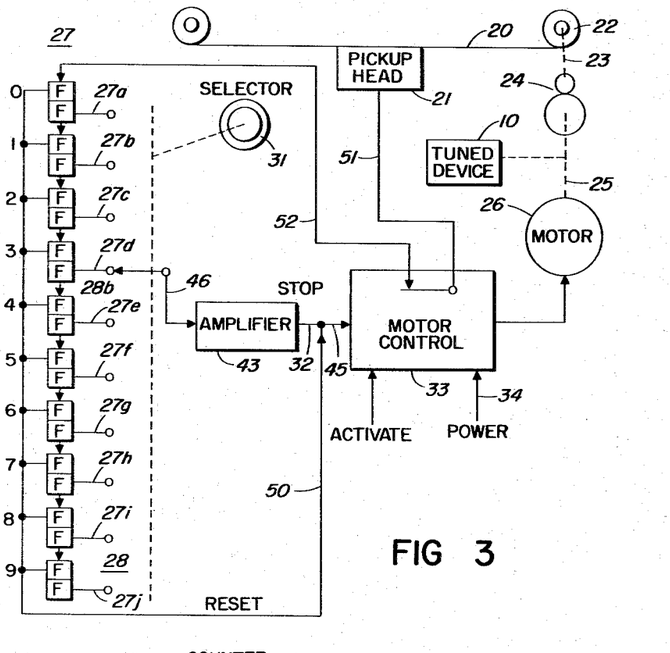
FIGURE 3 is a functional schematic diagram of a further embodiment of the present invention employing vernier positioning by means of plural channels on a controlling tape.

Operational aspects of the system functionally portrayed in FIGURE 1 may better be comprehended by reference to the more detailed diagram of FIGURE 3. Taped impulses, detected by pick-up head 21 are applied to a pulse counter 27 comprised of ten flip-flop stages in a well known cascade arrangement. The impulses from pick-up head 21 are indicated as being applied to the motor control 33 in a selective manner. A subsequent discussion of the motor control circuitry will indicate the need for applying the impulses to the counter 27 only when the system is operating in a forward or tuning mode.

The counter 27 operates in conventional manner to "distribute" input pulses to the plurality of output lines 27a–27j. Each successive input pulse causes a change in conductive state of a flip-flop output stage to effectively travel down the cascaded arrangement. The output lines from the counter 27 are connected to like stages of the selective flip-flop stages such that a particular change of state in any stage is imparted to its associated output line as a like pulse and the particular output line upon which the pulse appears is a function of the number of input impulses applied to the counter chain. The comparator 28, pictured in FIGURE 1, may then simply take the form of a selective switch having a rotor 28b and ten stator contacts 28a connected to the counter outputs 27a through 27j, respectively. Actually, the comparator 28 and pulse count selector 30 of FIGURE 1 are embodied in FIGURE 3 as the multipole switch arrangement. The position of the rotor 28b may be selected by a selector knob 31. The knob 31 might be calibrated in positions 1–10, in terms of frequency, should the positioned device be a tuned circuit, in terms of channels if the positioned device is actually a channel selection arrangement in a radio, etc. As indicated in FIGURE 3, with the switch rotor 28b connected to output line 27d from the counter chain 27, the fourth pulse applied to the counter causes a pulse to be carried through rotor 28b to an amplifier 43. This pulse is utilized in two ways. The output from amplifier 32 is applied through line 50 in common to the counter stages 27 to reset the counter to 0. The output from amplifier 32 is applied through line 45 as a stop control impulse to the motor control circuitry 33. Considering then that the tape 20 is initially translated over the pick-up head 21 under the control of motor 26 from a "home" position and, that the counter was reset to 0 at the initiation of the cycle, the position of switch 28b determines which of the successive impulses detected by pick-up head 21 is utilized to stop the motor and thus define a selected position of shaft 25. As will be further described, motor control circuitry 33 readies the system for a repeat cycle upon the completion of a preceding cycle and, when activated, translates the tape and the positioned device 10 to a "home" position, effects a motor reversal, and then allows the motor to run until a stop impulse 32 is applied to the motor control circuitry. The stop impulse is simply a selected one of a succession of magnetic impulses prerecorded on the tape 20, each of which defines a given position of the motor shaft 25 through the mechanical interlinkage between tape and drive mechanism and thus defines a given position of the positioned device 10 which is also driven by the motor 26.

In the embodiment of FIGURE 3, utilizing the ten stage counter and employing a tape 20 with ten spaced magnetic impulses recorded thereon, the selector and automatic attainment of ten output shaft positions may be selectively effected by positioning the switch rotor 28b. The output shaft 25 from motor 26 is indicated functionally as being directly coupled to the positioned device 10 while being coupled to the tape reel 22 through a reduction gearing 24. The reduction gearing 24 might represent a considerable gear reduction such that one revolution of the motor shaft 25 might represent the translation of a considerable tape footage past pick-up head 21. This feature effectively magnifies the accuracy of the tuning device. The greater the tape translation effected for a given rotation increment of a shaft 25, the less stringent are the requirements of the position of the controlling magnetic pips on the tape. Looking at the situation in reverse, any error in the position of the magnetic pips on tape 20 is reduced in proportion to the gear ratio affected by gear reduction 24 as concerns the effected position of the device 10.

The embodiment of the invention thus described employs but a single channel on the tape 20. The number of selected positions was seen to be determined by the number of magnetic impulses recorded on the tape in conjunction with a like number of stages in the pulse counter 27. A more versatile arrangement employing the principle of the invention is shown functionally in FIGURE 4.

Figure 4:
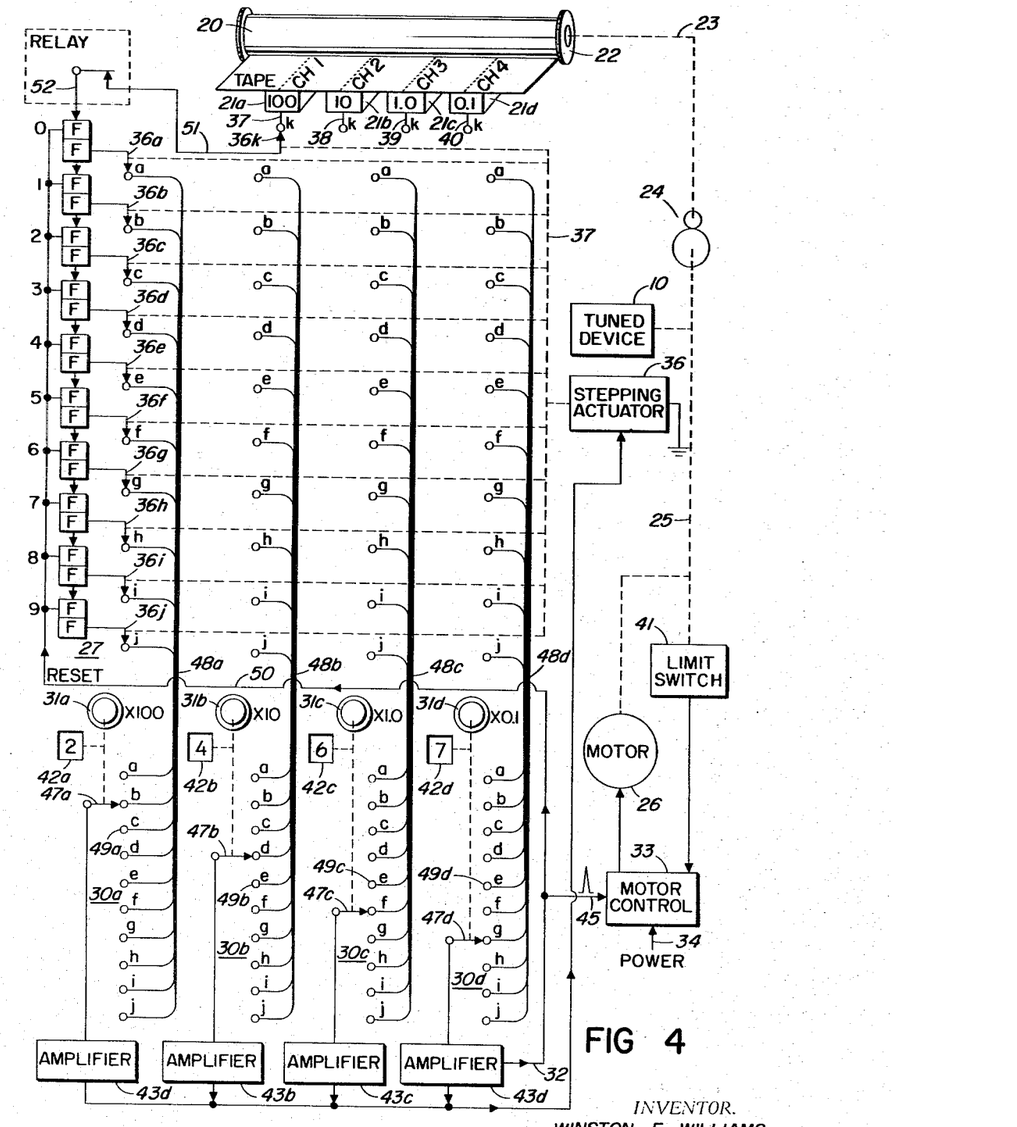
FIGURE 4 is a functional schematic of a motor control circuit which may be used in conjunction with the invention.

The embodiment of FIGURE 4 is an extension of the principle employed in the single channel embodiment. A plurality of tape channels are employed, with magnetic impulses recorded on subsequent channels in a vernier fashion. Four such channels are depicted in the embodiment of FIGURE 4. For illustrative purposes, channel 1 on tape 20 might have recorded thereon magnetic impulses at intervals corresponding to hundreds, channel 2 would have recorded thereon magnetic impulses in increments of 10 with ten impulses appearing on channel 2 between each pair of impulses on channel 1. Channel 3, in turn might be considered the units channel and have ten impulses recorded thereon between each pair of impulses on channel 2. Channel 4, in further vernier-like fashion, might have recorded thereon, ten impulses for each pair of each impulse on channel 3. Each of the channels 1–4 is monitored by an associated pick-up head. Head 21a monitors channel 1, head 21b monitors channel 2, head 21c monitors channel 3 and head 21d monitors channel 4. As in the previously described embodiment, the magnetic impulses detected by the pick-up heads are applied to a ten stage pulse counter 27. The action to be effected is sequential in nature in the multichannel embodiment and the comparator function and pulse selection circuit function is extended four-fold. The positioning sequence operates on a four-step basis whereby the position of the tape is first controlled to a selected hundreds pip position and successively to a selected tens position within the hundreds increment to a selected units position within the selected tens position and finally to a selected tenths position within the selected units position.

Figure 2B:
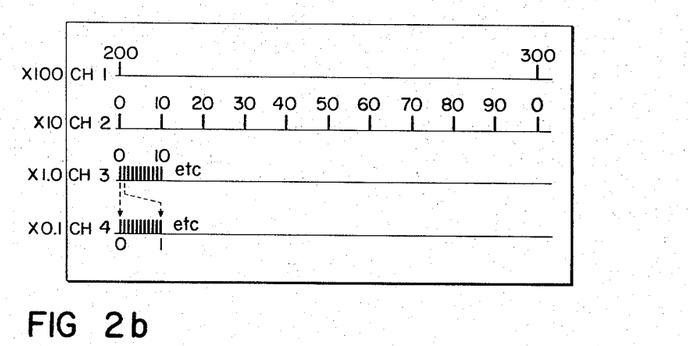

FIGURE 2b illustrates diagrammatically the placement of magnetic impulses on channels 1–4 as they might apply to a tuning system operating between 200 and 300 megacycles, for example. Channel 1 in this instance has impulses recorded thereon corresponding to the 200 and 300 megacycle positions. Channel 2 has recorded thereon impulses corresponding to tenths of channel 1 divisions with impulses recorded at positions corresponding to 0, 210, 220, etc. Channel 3 has recorded thereon ten impulses between each successive pair of impulses on channel 2. Channel 4 would have recorded thereon ten impulses between each pair on channel 3. The scale factor of FIGURE 2b is obviously reduced for illustrative purposes. One may consider the tape 20 to be several feet in length such that the smallest subdivision defined by the impulse on channel 4 may be precisely recorded thereon.

Referring again to FIGURE 4, the outputs from the flip-flop stages of counter 27 are individually connected to switch rotors 36a–36j. The outputs 37–40 from the pick-up heads 21a–21d are connected individually to switch terminals. In the position illustrated, the output 37 from pick-up head 21a is connected to the pulse counter 27. The outputs 36a–36j from the successive flip-flop stages are connected individually to stator terminals a–j of a "hundreds" selector switch 30a. For clarity, the individual connections from the flip-flop stages to the stator terminals 49a of switch 30a are indicated as a cabled interconnection 48a. The switch rotors 36a–36j are actually stepped in sequence along with the head selector rotors 36k to successive stator terminals each of which is individually connected through a cable arrangement 48b, 48c, 48d to further selector switches 30b, 30c, and 30d. The stepping switch arrangement is under the control of a step actuator mechanism 36 having a common mechanical interconnection 37 to each of the switch rotor arms 36a–36k.

Assuming the motor 26 is running from a home position and considering for the moment that the switch 36 is in the position illustrated, a selected one of the "hundreds" pips on channel 1 is first utilized to drive the tape and output shaft to a position selected by the hundreds selector 30a. In the position illustrated switch 30a is set by a control knob 31a to the second position so as to select the second hundreds impulse detected by pick-up head 21a. This impulse is taken from the second flip-flop stage through stepping switch rotor 36b to stator contact b of selector switch 30a and thence through rotor 47a and amplifier 43a to a common stepping line 44 which is tied to the stepping actuator 36 to move the stepping switch rotors 36a–36k to the second set of contacts. The output from channel 2 of tape 20 now is the control parameter and impulses on channel 2 are detected by the pick-up head 21b and applied through a selected stator contact of selector switch 30b and amplifier 43b again steps the actuator 36 to effect interconnection of the third (units) tape channel and the third selector switch with the pulse counter. In like fashion, when the selected one of the units impulses is detected, amplifier 43c develops an impulse on actuator line 44 to step the actuator 36 to the final position so as to interconnect the tenths channel. When the selected tenths impulse is detected by pick-up head 21d, amplifier 43d associated with selector switch 30d develops a final impulse. Amplifier 43d is illustrated as having two outputs the first one of which is tied to the stepping actuator line 44 to step the switch 36 back to the initial position and a second output 32 applied to the motor control 33 and through line 50 to the stage of the pulse counter 27 to reset the counter.

The operation of the embodiment of FIGURE 4 is seen to uniquely reset the operational cycle of the single channel embodiment by effectively dividing the positioning sequence into four stages each stage of which effectively positions the output shaft to a successively finer position increment in a vernier-like fashion. Whereas, in the single channel embodiment, a selected one of the magnetic impulses was utilized to stop the positioning sequence, the multichannel embodiment utilizes the selected impulses to step the comparator circuitry to the successive pick-up heads and selector switches and uses the output of the final control circuitry to stop the motor.

FIGURE 4 illustrates a selection of 246.7 which might corrrespond to the tuned frequency of a tuned device 10. The actual tuned frequency might be indicated by a counter display associated with each of the selector knobs 31a–31b. In operation, the selected frequencies would first be set by means of selector knobs 31a–31d. An actuator (associated with motor control 33) might then be depressed to start the positioning sequence. Assuming for the moment that the tape is in a "home" position, the hundreds impulse from channel 1 on tape 20 are first applied as input to the pulse counter 27 and second one as set by selector switch 30a steps the stepping switch 37 to interconnect the second tape channel to counter 27 while connecting the output from the counter stages to selector switch 30b. When the fourth impulse from tape channel 2 is detected, stepping switch 36 is again activated to interconnect tape channel 3 to selector switch 3. When the sixth impulse from channel 3 is detected, amplifier 43 develops an impulse to step switch 36 to interconnect channel 4 with the pulse counter and the output of the pulse counter to selector switch 30d. When the seventh impulse from tape channel 4 is detected, the amplifier 43d develops an output 32 to stop motor 26 and reset the counter 27 to 0, and a second output to the actuator line 44 to step switch 36 back to the channel 1 interconnection.

The recorded impulses, as indicated diagrammatically in FIGURE 2b, are indicated in pure vernier fashion; thus, for example, an impulse occurs at tape positions 200 and 300 on the channel 1 track, 10 impulses occur at equally spaced intervals on channel 2, each corresponding to a 10's increment, etc. It is noted, therefore, that a selection of 200.0 would be selected by pulses on each of the succeeding channels which are in time coincidence as concerns their passage past the pick-up transducers. Since a sequential control from channels 1–4 is to be effected, the detection of the selected pulse on channel 1 must initiate a step action to change the control to channel 2, etc. The selected impulse in the fourth channel was described as being that which stops the motor and thus defines the position of the output shaft. It is apparent therefore, that in order to insure sequential switching, the impulses on each succeeding track, while being decade intervals of those on the preceding track, should be displaced time-spacewise in order that a time interval for operation of the stepping switch 36 is provided for each step in the tuning sequence. Although not specifically illustrated in FIGURE 2, if "d" were a tape footage between impulses on any given track, the intervals between impulses on the succeeding track would be d/10 and would be displaced position-wise on the tape such that each impulse on a track is bracketed by a pair of impulses on the succeeding track. The displacement for each of these tracks with respect to the preceding impulse spacing might then be one-half the impulse displacement. With this arrangement, a selection of 200.0, for example, would not be defined by a simultaneous occurrence of impulses on each of the four tracks passing the pick-up transducers. The hundreds impulse would first be detected followed in time sequence by impulses from the tens, units and hundreds tracks. The calibration of the system would then be defined by the precise position of the impulses on the track providing the finest control increment, and it would follow that the time interval defined by a particular tape speed and the finest impulse intervals would be such that the stepping switch arrangement could be effected in one-half that time due to the bracketed positioning of the pulses on the succeeding channels.

A further arrangement, not illustrated, might provide for the necessary bracketing control by placing the impulses on the tape in pure vernier-like fashion as illustrated in FIGURE 2 and staggering the successive transducers with respect to the tape such that the transducer associated with the coarsest controlling channel would be the first to be aligned with any particular cross-section of the tape as the tape passed the transducing arrangement. In this situation, the angle defining the "stagger" of the transducers would be defined by the spacing between the finest control increments of the $n$th channel and speed of tape travel to again insure sufficient time for the stepping action to occur for any particular control sequence.

The decade arrangement in conjunction with four channels provides a $10^4$ output shaft position capability by positioning of the four selector switches 30a–30d. Although not specifically illustrated, it is obvious that the principle might be extended to further control subdivisions, utilizing a plurality ($n$) of tape channels in conjunction with ($n$) selector switches and a stepping switch having $m$ positions to realize $10^m$ selector output shaft positions.

In either of the above-described embodiments, the motor control circuitry 33 must sequentially drive the system to a "home" position, reverse the motor, and then translate the tape from the "home" position to a selected position at which time the motor is stopped. The motor control circuitry 33 thus selectively applies power to the motor in both a forward and a reverse sense, and, under the control of a stop impulse, de-energizes the motor.

A still further control feature is necessary in that the output from the tape head or heads must be disconnected from the control circuitry during reverse drive of the tape to the home position. This is necessary since the pulse counter is not inherently "educated" as to the sense of direction of tape travel. The counter 27 simply counts impulses applied thereto and these impulses must be applied only when the system is driven from "home" to the selected position as defined by a particular impulse count.

Figure 5:
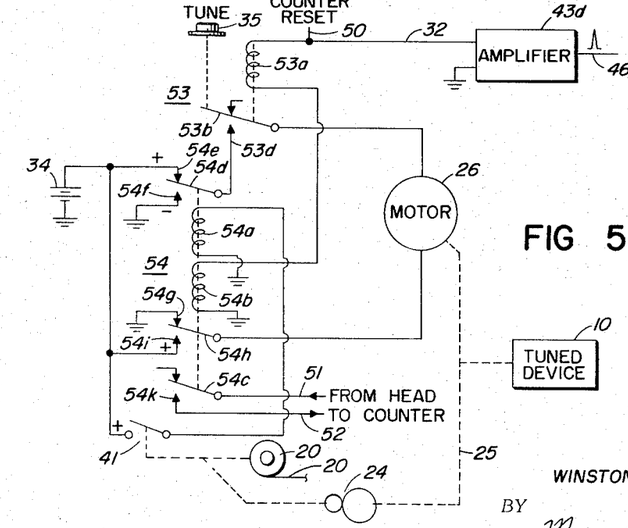
FIGURES 5–13 are diagrammatic representations of the characteristics of a tuned circuit and the manner in which the characteristics thereof may be used to generate impulses corresponding to tuned resonance and be recorded on a tape for subsequent automatic tuning control.

A type of control circuitry which might be utilized to attain these results is illustrated in FIGURE 5. The embodiment is comprised of latching relays interconnected between a power source 34 and the motor 26 and responsive to stop impulses 32 to perform the start, stop and reverse logic previously described.

A first relay 53 receives the stop impulse 32 which, in each of the embodiments, was discussed as being the output from amplifier 43. In the single channel embodiment of FIGURE 3, the stop impulse is the selected one of the pulses counted by the counter. In the multichannel embodiment of FIGURE 4, the stop impulse is the output of the least significant or $n$th one of the pulse selecting channels.

Relay 53 would be a latching relay of the manual reset type. The relay comprises a solenoid winding 53a which is responsive to stop impulses 32 to position the armature 53b to the upper position illustrated in FIGURE 5. The manual reset feature allows a mechanical activator, such as the tune knob 35 affixed to the armature 53b, to be depressed and place the armature in the lower of the two illustrated positions.

A second relay 54 is incorporated which comprises a pair of solenoid windings 54a and 54b each of which is instrumental in positioning three armatures 54d, 54h, and 54c to one of two positions which are held until the solenoids are further energized. Thus, relay 54 might be termed a latching relay which is electrically resettable.

Solenoid winding 53a of relay 53 and winding 54b of relay 54 are seen connected in series between the input stop pulse line 32 and system ground. The motor terminals are connected between armature 53b of relay 53 and armature 54h of relay 54. The power source, depicted as a battery 34, has a negative terminal tied to common ground. The positive terminal of battery 34 is connected to the upper contact 54e and the lower contact 54i of a first pair of contacts associated with the relay 54. Contacts 54f and 54g of relay 54 are connected to common ground. The positive terminal of the battery 34 is additionally connected through a "home" position reversing switch 41 to solenoid winding 54a of relay 54. Switch 41 is mechanically linked to the shaft positioning system of the embodiments and might be a microswitch which closes when the shaft is driven to its "home" position limit. Relay winding 54a is energized when the "home" position reversing switch 41 is closed.

A further set of relay contacts associated with relay 54 comprise an armature 54c and stationary contact 54k, which, when closed, connect line 51 from the transducer head or heads to line 52 which applies the transducer output to the pulse counter.

In operation, the control circuitry of FIGURE 5 is depicted with the relay positions realized when the system has driven the output shaft 25 to a preselected position and the generation of a stop pulse 32 has stopped the motor. Under this condition it is seen that the lower terminal of the motor is connected to ground through relay contacts 54h and 54g while the upper motor terminal is disconnected from the positive terminal of the power source. The system is thus at rest and de-energized.

Now, assuming that a different shaft position has been selected by the operator, the positioning sequence is initiated by manually depressing the tuning knob 35 to reset the latching relay 53 such that the armature is retained in the lower position with contact made between armature 53b and terminal 53d. This manual action completes connection between the upper motor terminal and the positive terminal of the battery 34 through relay contacts 53b–53d and relay contacts 54d–54e. The lower motor terminal is connected to ground through contacts 54h and 54j of relay 54. The motor thus rotates in a direction which would be defined as the "homing" direction. The motor continues to run to the "home" position until the "home" position reverse switch 41 is closed. During this reverse rotation, relay contacts 54c and 54k of relay 54 are open and disconnect the transducer output from the pulse counter.

When switch 41 is closed at the "home" position, the relay 54 is energized since the positive terminal of the battery 34 is connected to relay winding 54a. Relay 54 is positioned to the down position and, as above described, is of the latching type wherein the position is retained. With relay 54 in the down position, contacts 54h and 54g are open to break the ground connection to the lower motor terminal. The motor is thus stopped when "home" position is reached. However, relay contacts 54h–54i is made at this instant to connect the positive battery terminal to the lower motor terminal while relay contacts 54d–54f are closed to connect the system ground through contacts 53b–53d of relay 53 to the upper motor terminal. The motor is thus energized in a reverse direction and caused to operate the system in the tuning or control direction. The motor continues to run with the impulses from the tape transducer or transducers being connected to the pulse counter since relay contacts 54c and 54k are closed for this direction of motor rotation. As previously described, the motor continues to run until the system develops a stop pulse 32 from amplifier 43. Stop pulse 32 energizes winding 53a of relay 53 to return the armature 53b to the upper position and thus break the positive battery connection to motor 26. Since winding 54b of relay 54 is serially connected with winding 53a of relay 53, the relay 54 is likewise operated to the upper position illustrated to return the system to the initial condition wherein it is noted that the lower terminal of motor 26 is connected to ground once more through contacts 54b–54g and the upper motor terminal is selectively conlectable to the positive battery terminal when the activator button 35 is again depressed to initiate a further positioning sequence.

The motor control circuitry described in FIGURE 5 is thus seen to provide the control logic to first drive the system to a "home" position while deactivating the stop pulse circuitry and then sequentially to reverse the motor rotation while activating the pulse counting circuitry, causing motor rotation and thus, positioning of the shaft 25, until the occurrence of a stop pulse 32 from amplifier 43.

The tape controlled shaft positioning system of this invention provides a linear relationship, as concerns the tape travel and the rotation of the shaft 25 controlling the positioned device 10. Should the positioned device be a tuned circuit having a nonlinear frequency versus input shaft rotation characteristic, the use of the tape as the controlling factor provides a degree of versatility. One might fashion a mechanical cam between the motor shaft 25 and the shaft of the tuned device 10 to convert the linear line motor drive characteristic to the nonlinear relationship defined by the tuning characteristic of device 10. In this instance the impulses on the tape to effect tuning could be a linear arrangement.

The present invention, however, could readily permit "tailoring" a particular tape to a given tuned device 10. The recording of the impulses on the tape might be generated as an exact function of the resonant characteristic of the tuned device 10. In this instance, the tape transducers could be combination record and playback heads and means employed to generate an impulse in time correspondence with the peak of the resonant characteristic of the tuned device at given frequencies.

Figure 6A:
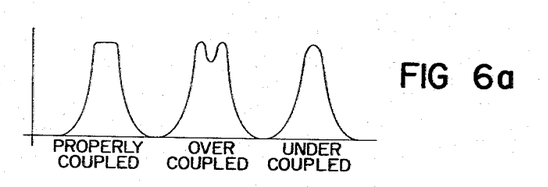

The manner in which such impulses might be generated may be illustrated from a consideration of a typical response curve of tuned circuits. FIGURE 6a illustrates three response curves which a high Q tuned circuit will generally follow. In an ideal situation "properly coupled" responses would be desired throughout the tuning range. If deviation from optimum coupling must be tolerated, the under-coupled response is a lesser evil than the over-coupled response. Considering the characteristic of tuned circuits, maximum output is developed when the top or peak of the response curve is at input frequency. Tuning may thus be accomplished by peaking a meter located across the output. Automatic tuning presents an additional requirement of mechanically tuning the circuit to a predetermined location such that the physical location or condition of frequency defining arrangements in the circuit provides resonance at the desired frequency.

Figure 6B:
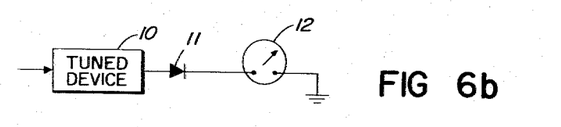
Figure 7:
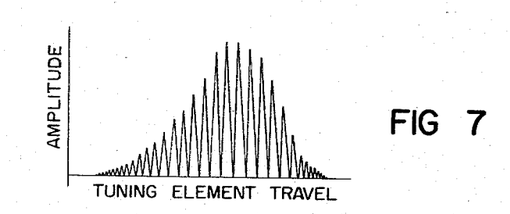

Considering the configuration of FIGURE 6b, a meter 12 placed across the tuned circuit output voltage as rectified by diode 11 would indicate the envelope or characteristic illustrated in FIGURE 6a. If the rate at which the circuit were tuned across resonance were constant, the unrectified output from the circuit 10 would appear much like one-half cycle of a modulated carrier, and when rectified, would take the appearance of that depicted in FIGURE 7.

Figure 8:
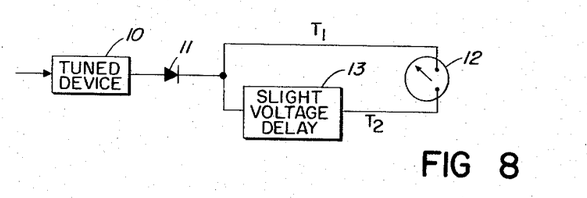
Figure 9:
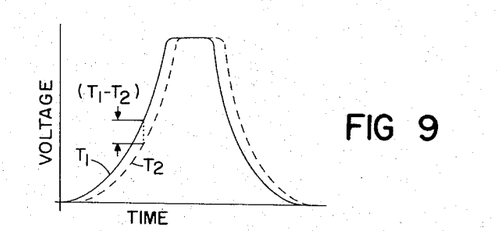
Figure 10:
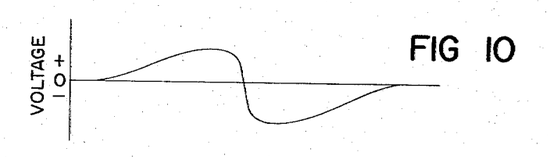
Figure 11:
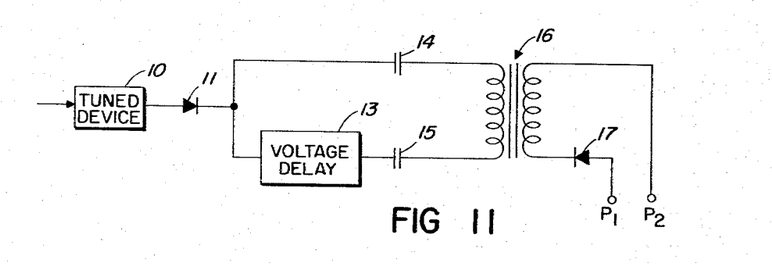
Figure 12:
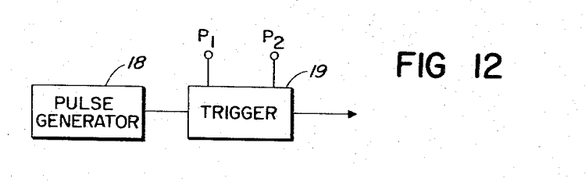

If it is desired, the resonant peak may be detected for the purpose of recording the peak on the tape for automatic control by a method depicted in FIGURE 8 wherein the output of the tuned circuit, which is caused to be mechanically tuned throughout its range, is rectified by diode 11 and applied both directly and through a delay 13 to an indicating meter 12. In the scheme of FIGURE 8, the meter is reading the difference in amplitude of the voltage curves $T_1$ and $T_2$ depicted in FIGURE 9 at any instant in time. Observation of FIGURE 9 reveals that the voltage amplitude difference $(T_1-T_2)$ drops to zero at point A. This sudden voltage drop may be utilized to indicate that the circuit has reached peak output voltage and thus is tuned to resonance. FIGURE 10 represents a plot of the voltage difference $T_1-T_2$ as plotted against time. The sudden voltage drop in the characteristic may be utilized as indicated in FIGURE 11. The output from tuned circuit 10 is rectified by diode 11 applied directly and in a delayed fashion through coupled capacitors 14 and 15 to the primary winding of transformer 16. The secondary winding of transformer 16 is tied directly to terminal P2 and through diode 17 to terminal P1. If now, the tuned device 10 were mechanically tuned through its range at a comparatively high rate and the bandwidth of the circuit is comparatively narrow, a voltage will appear across the primary of the transformer 16 as soon as the skirt of the curve of the circuit 10 is reached. This voltage will continue to rise until point A is reached. The sudden reversal of voltage will again appear across the primary but at this time the induced current in the secondary of transformer 16 is not blocked by the diode 17, and a momentary impulse will appear across terminals P1 and P2 in time correspondence with the characteristic of the circuit 10 being tuned to resonance at a given input frequency within its passband. The impulse appearing at terminals P1 and P2 of FIGURE 11 might then be applied as indicated in FIGURE 12 to a trigger circuit 19 in conjunction with a pulse generator 18 to develop an output pulse at the instant the tuned circuit reached peak output voltage.

Figure 13:
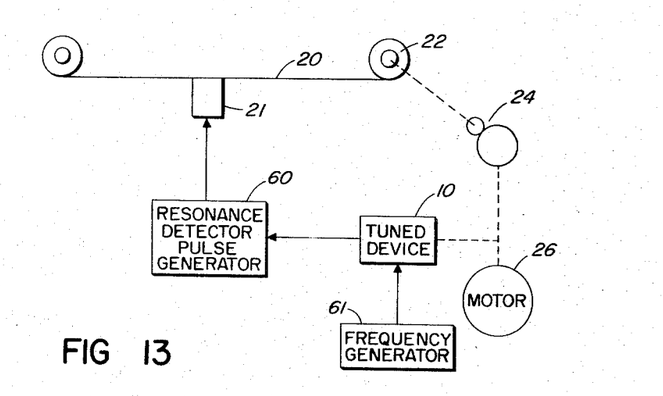

FIGURE 13 represents diagrammatically the manner in which the shaft positioning system of the invention might be "customized" to a particular tuned circuit characteristic. Since the tape travel past the transducer 21 is a linear function of the rotation of the output shaft 25 of motor 26, shaft 25 might then be rotated either by means of motor 26 or manually such that the tuned device 10 is caused to be tuned through its limits. An input signal may be applied to tuned circuit 10 from the frequency generator 61 at precise frequencies within the passband of circuit 10 at which it is desired to calibrate the tape 20. The previously described circuit of FIGURES 11 and 12 is indicated as a resonance detector and pulse generator arrangement 60 the output of which is applied to the transducer 21 and thus recorded on the tape 20. The impulse on tape 20 is thus at the position in the tape travel corresponding to a precise rotational input to the tuned circcuit 10 effecting resonance at the particular operating frequency. The tape 20 is thus calibrated precisely to the particular tuned circuit 10 and may thereafter be utilized as heretofore described to automatically tune the circuit 10 to preselected frequencies within its tuning range.

The automatic tuning system of the present invention provides a versatile control arrangement for automatically controlling a shaft to a number of preselected output positions. Since the drive arrangement between the output shaft and the tape travel may be geared as desired, an extremely large number of output positions may be accurately attained by increasing the tape travel versus output shaft rotation relationship.

Although the present invention has been described with respect to particular embodiments thereof it is not to be so limited. The tape and transducer arrangement has been described as a magnetic tape and a tape head as transducer. The basic principle of the invention embodies the counting of a number of impulses at particular points in the travel of the tape past a transducer wherein the tape and transducer coact to provide electrical impulses at predetermined points in the tape travel. It is thus obvious that the tape "impulses" might be in the form of tape perforations and the transducing arrangement might be a light source and photoelectric pick-up device which would produce an impulse as each perforation passed between the light source and photoelectric pick-up.

Although not specifically illustrated and described, a preferred embodiment would employ a tape with single or double perforated drive tracks thereon cooperating with a sprocket drive arrangement which would be mechanically geared to the driving motor shaft.

I claim:

1. Means for selectively rotating a shaft to a plurality of preselected positions comprising a drive motor connected to said shaft, a magnetic tape and transducing means associated therewith, means for driving said tape with respect to said transducing means as a function of said shaft position, said tape having recorded thereon a plurality of magnetic impulses disposed longitudinally along said tape, pulse counting means receiving the output of said transducing means, comparator means receiving the output of said counting means, count selecting means connected to said comparator means, said comparator means producing an output in response to a preselected one of said magnetic impulses being applied to said counting means, and motor control means connected to and responsive to an output from said comparator means to de-energize said motor in response to a preselected one of said plurality of magnetic impulses being applied to said pulse counting means.

2. A positioning system as defined in claim 1 wherein said tape has recorded thereon a single recording track, said pulse counting means comprising a plurality of cascaded flip-flop stages including a first stage to which the output from said transducing means is applied, a plurality of output lines connected individually to each of said flip-flop stages, said count selecting means comprising means for selectively connecting individual ones of said pulse counter output lines to said motor control circuit to de-energize said motor in response to an output pulse being developed on the selected one of said output lines, and counter reset means connected between said selected one of said lines and said counter to reset said counter to an initial condition upon said motor being de-energized.

3. A system as defined in claim 2 wherein said motor control means comprises a polarized source of power, switching means responsive to actuating means to connect said power source to said motor with a first polarization to drive said motor in a first direction to a predetermined reference position and effect a starting position of said tape with respect to said transducer, means responsive to motor rotation in said first direction to disconnect the output from said transducing means to said pulse counting means, means responsive to said reference position being effected to reverse said motor rotation and effect connection between said transducing means and said pulse counting means, and means responsive to an output impulse from said comparator means to de-energize said motor.

4. A system as defined in claim 3 wherein said tape is translated with respect to said transducing means by means of mechanical connection to the shaft of said motor, said mechanical connection being effected through a predetermined gear ratio whereby a selected tape travel is established for a predetermined rotation increment of said motor shaft.

5. A system as defined in claim 4 including a driven device connected to said motor shaft and positioned in accordance with the rotation thereof.

6. A system as defined in claim 5 wherein the disposition of said magnetic impulses on said tape is defined in accordance with an operational characteristic of said driven device with respect to a given rotational input thereto.

7. A positioning system is defined in claim 1 wherein said tape carries a plurality of $n$ recording tracks thereon, said transducer means being comprised of $n$ pick-up heads each individually cooperating with an associated one of said recording tracks, each of said recording tracks having recorded thereon a plurality of magnetic impulses, each of said recording tracks successively having a plurality of impulses disposed thereon in predetermined space relationship and occurring in an interval defined by adjacent ones of those impulses recorded on the preceding track, said comparator means comprising means for successively connecting the output of each of said $n$ transducers to an associated one of a plurality of $n$ selector switches, said connections being effected between successive head and selector switch upon a selected one of the impulses on a preceding tape track being detected, the selected impulse appearing on the $n$th and final one of said transducers being connected to said motor control means to de-energize said motor, selected impulses from preceding ones of said transducers being connected to a common line and to said pulse counter to effect reset thereof in response to an impulse appearing on said common line, said common line connected additionally to said comparator means to effect the aforedefined successive switching in response to impulses appearing on the line.

8. A system as defined in claim 7 wherein said comparator means comprises stepping switch means including an actuator responsive to the impulses on said common line.

9. A system as defined in claim 8 wherein said stepping switch means comprises a stepping switch having $n$ rotors each cooperating with an associated stator having $m$ contacts, said pulse counting means comprising a plurality of $m$ cascaded flip-flop stages, each position of said stepping switch effecting interconnection between the outputs of each of said $m$ flip-flop stages to associated stator contacts of successive ones of said selector stepping switches, said stepping switch actuator mechanically positioning each of said $n$ rotor contacts, each of said selector switches being responsive to an impulse on a selected stator contact thereof to activate said actuator and effect interconnection of successive ones of said transducer means and their associated selecting switch stator contacts to the stages of said pulse counting means.

10. A system as defined in claim 9 wherein a first one of said $n$ tape tracks has a predetermined number of impulses recorded thereon at equally spaced intervals and successive ones of said tape tracks having recorded thereon ten impulses each spaced one-tenth the distance of those impulses recorded in the preceding one of said tracks, said pulse counter being comprised of ten stages and said selector switches having ten stator contacts each of which is individually connectable to one of said counter stages.

11. A system as defined in claim 8 further comprising pulse amplification means connected between each of said selected switch rotors and the common line connected to said stepping switch actuating means.

12. A system as defined in claim 7 wherein a controlled device is connected to and positioned in accordance with the rotation of said motor shaft, said controlled device comprising a tunable radio circuit having a nonlinear tuning characteristic, each of said tape channels being comprised of recorded magnetic impulses having space relationships defined in accordance with the nonlinear characteristic of said tunable circuit.

13. A system as defined in claim 12 wherein the magnetic impulses recorded on said tape channels are spaced in accordance with the resonance tuning characteristics of said radio circuit by means connected to said tunable circuit and adapted to produce an impulse in response to said circuit being tuned through resonance, said impulse being applied to said transducer to record said impulse on said tape, whereon the impulse is recorded at a tape position corresponding to the motor shaft position effecting the tuning of said device to resonance at a predetermined frequency.

References Cited

UNITED STATES PATENTS

| | | | |
|---|---|---|---|
| 2,989,680 | 6/1961 | Weiser et al. | 318—467 |
| 3,078,404 | 2/1963 | Dumaire | 318—162 |
| 3,117,263 | 1/1964 | MacDonald | 318—22 |

BENJAMIN DOBECK, *Primary Examiner.*